(12) United States Patent
Slatten

(10) Patent No.: US 6,286,852 B1
(45) Date of Patent: Sep. 11, 2001

(54) SELF-ALIGNING HITCH

(76) Inventor: Ivan Boaler Slatten, 1892 - 154th Street, Surrey, British Columbia (CA), V4A 5J8

( * ) Notice: Subject to any disclaimer, the term of this patent is extended or adjusted under 35 U.S.C. 154(b) by 0 days.

(21) Appl. No.: 09/612,569

(22) Filed: Jul. 7, 2000

(51) Int. Cl.$^7$ .................................................. B60D 1/167
(52) U.S. Cl. ..................... 280/479.3; 280/477; 280/478.1
(58) Field of Search ............................. 280/477, 478.1, 280/479.2, 479.3, 482, 490.1, 491.1, 491.2

(56) References Cited

U.S. PATENT DOCUMENTS

| | | | | |
|---|---|---|---|---|
| 2,973,971 | * | 3/1961 | Oddson | 280/478 |
| 3,807,768 | * | 4/1974 | Jones | 280/478 |
| 3,860,267 | * | 1/1975 | Lyons | 280/478 B |
| 3,912,119 | * | 10/1975 | Hill et al. | 280/478 |
| 4,114,921 | * | 9/1978 | Thorell et al. | 280/478 |
| 4,558,883 | * | 12/1985 | Bouma | 280/478 |
| 4,603,878 | * | 8/1986 | Smith, Jr. | 280/478 |
| 4,951,957 | * | 8/1990 | Gullickson | 280/479.2 |
| 5,288,096 | * | 2/1994 | Degelman | 280/508 |
| 5,322,315 | * | 6/1994 | Carsten | 280/479.2 |
| 5,547,210 | * | 8/1996 | Dugger | 280/477 |
| 5,630,606 | * | 5/1997 | Ryan | 280/479.3 |
| 6,126,188 | * | 10/2000 | Volodarsky | 280/478.1 |

* cited by examiner

Primary Examiner—Brian L. Johnson
Assistant Examiner—Daniel Yeagley
(74) Attorney, Agent, or Firm—Oyen Wiggs Green & Mutala

(57) ABSTRACT

A hitch for coupling a towing vehicle and a trailer vehicle, particularly in situations where the vehicles are misaligned. The hitch has a tongue housing for attachment to one of the vehicles and a tongue for extension and retraction within a throat defined by the tongue housing. The tongue articulates laterally to couple misaligned vehicles. The tongue has a coupler, such as a clevis, ring or ball, on one end to effect coupling between the two vehicles. The tongue is movable to a locked position where a spring-biased pin is insertable through apertures in the tongue housing and the tongue to lock it in place. The tongue and the tongue housing have cooperating guide members to effect a smooth, guided movement of the tongue from an extended position to its retracted, locked position. The guide members have cooperating, rounded cam members and pockets which facilitate the smooth, guided movement of the tongue to its locked position. The tongue has a trunnion near to the end opposite the coupler to prevent the tongue from being completely withdrawn from the throat. Rounded side walls of the tongue housing define a generally hourglass shaped throat. The side walls guide the tongue during retraction into the housing, assisting in the smooth, guided movement to its locked position.

26 Claims, 10 Drawing Sheets

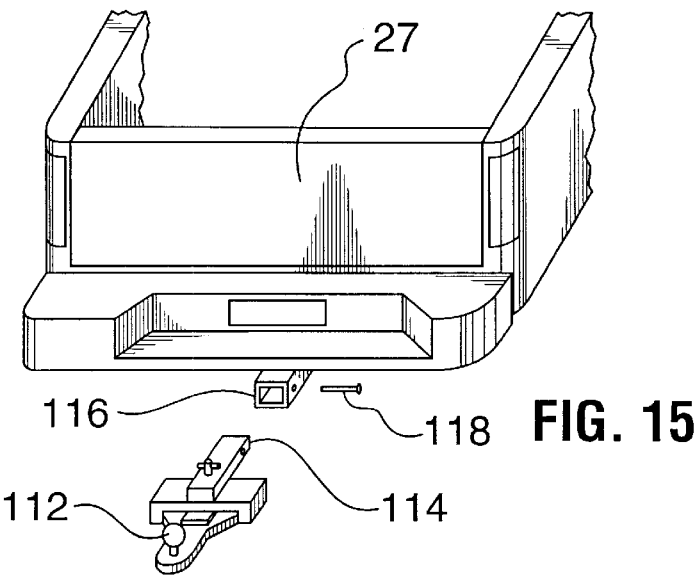
FIG. 15
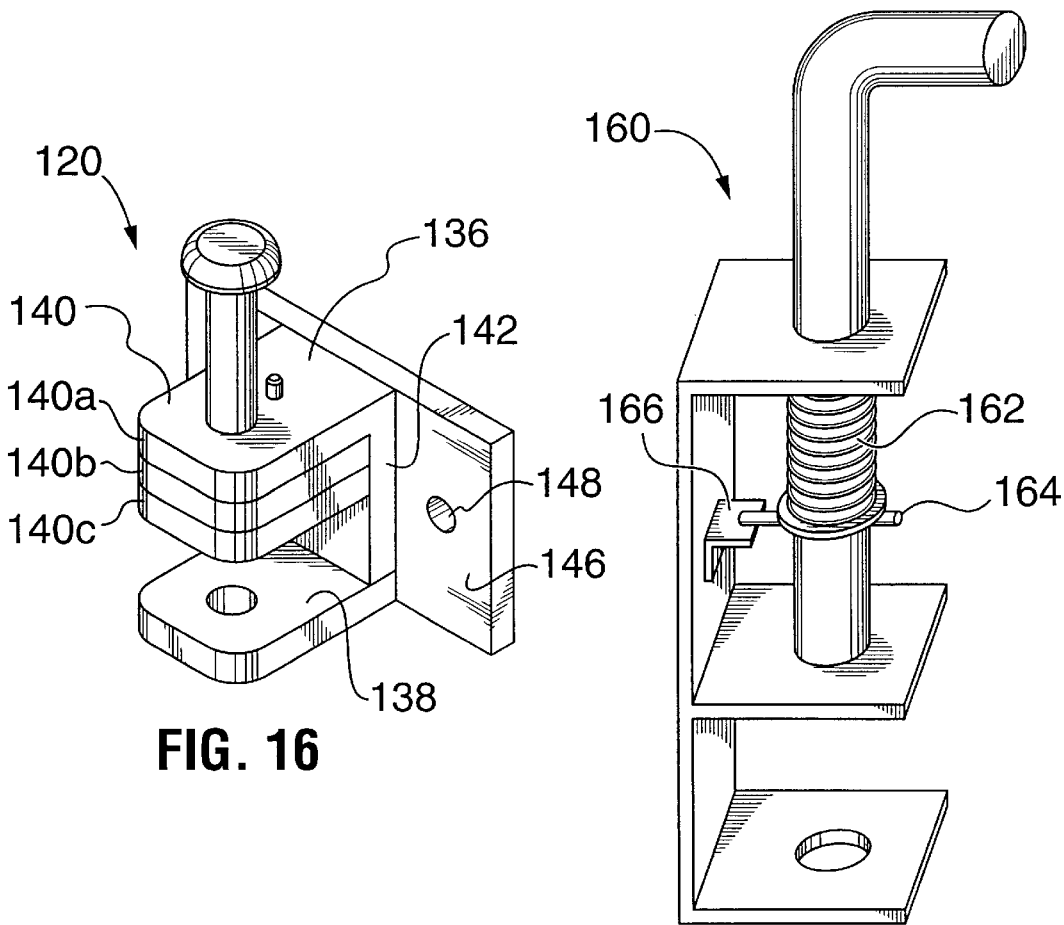
FIG. 16
FIG. 17
PRIOR ART

SELF-ALIGNING HITCH

TECHNICAL FIELD

This invention pertains to hitches, and more particularly to self-aligning hitches for coupling two imprecisely aligned vehicles, for example, a towing vehicle and a trailer vehicle.

BACKGROUND

Hitches are in wide use for towing many kinds of trailer vehicles by towing vehicles. Most traditional hitches comprise the combination of a first coupling means (for example, a ball) attached to one of the vehicles and a second coupling means (for example, a hollow, hemispherical coupler) attached to the other. Since such conventional coupling means are fixedly attached to the vehicles, it is necessary for the vehicles to be brought into precise alignment in order to achieve coupling. This can be a difficult and time-consuming task. In circumstances where precise alignment is not achieved, it may be possible to manually move the trailer vehicle to a position for coupling to the towing vehicle. While this may be acceptable for lightweight trailer vehicles, it is a near-impossible task for heavier trailer vehicles such as loaded airport freight carts. Persons attempting to manually position a heavy trailer vehicle may suffer injuries.

Further, it is desirable to prevent the need for a second person to assist in coupling the towing and trailer vehicles. In general, having a second person, located behind the towing vehicle, to direct the operator of the towing vehicle presents dangerous circumstances. Further, it is inefficient to require two people to achieve a result which could be accomplished by a single person.

In general, the prior art has attempted to address these problems with the provision of a hitch assembly comprising a tongue or rod which is slidably insertable into a housing mounted on one of the vehicles and which is capable of some longitudinal and lateral movement so that a rearward end of the tongue, fitted with a coupling means, can be manually positioned to engage the corresponding coupling means on the other vehicle. The hitch assemblies of some prior art references provide an automatic locking mechanism which locks the tongue into a "locked" position.

However, the prior art hitch assemblies may suffer from one or more disadvantages. For example, several prior art hitch assemblies have been designed in such a way that it is only possible for the tongue to move to the "locked" position after the tongue becomes aligned with the vehicles. As a result, after the vehicles are coupled and the towing vehicle is moved forward from a slightly displaced lateral position (relative to the trailer vehicle), the tongue may be susceptible to banging from side to side within the housing until the tongue and the two vehicles achieve precise alignment. This is disadvantageous since it: (1) may damage the sides of the housing, ultimately requiring repair or replacement; and (2) may place undue pressure on the pivot pin retaining the proximal end of the tongue within the housing. After a period of time, the pin may become damaged to the point where repair or replacement is necessary.

Along the same lines, several prior art hitch assemblies are designed in such a way that lateral movement of the tongue is not immediately possible after the locking mechanism is disengaged. Rather, the operator is required to withdraw the tongue entirely, or nearly so, from within the housing until lateral movement of the tongue is possible. This limits the use of the hitch assembly. In some circumstances, the operator may have backed the towing vehicle into close proximity to the trailer vehicle so that the tongue cannot be fully withdrawn since it will engage the front portion of the trailer vehicle. Since lateral movement is then not possible (since the tongue is not capable of being fully extended from the housing), the operator would be forced to get back into the towing vehicle and move it ahead to create sufficient space between the vehicles to enable full extension of the tongue, and thus, lateral movement of the tongue. This adds unnecessary time and effort into the process, and could be eliminated if one could laterally position the tongue immediately upon disengagement of the locking mechanism.

Prior art hitch assemblies which may suffer from one or both of the above-noted disadvantages are described in: U.S. Pat. No. 3,912,119, issued to Hill et al., U.S. Pat. No. 2,871,029, issued to Demarest, U.S. Pat. No. 3,860,267, issued to Lyons and U.S. Pat. No. 4,991,865, issued to Francisco.

The hitch assemblies described in Demarest, Hill et al., and Francisco may be susceptible to damage to the housing while the tongue is moving into the housing and towards its locked position from either side-to-side banging of the tongue therein, or from the longitudinal engagement of a proximal end of the tongue on a closed interior of the housing.

Other prior art hitch assemblies include overly complex mechanisms which may render the hitch assembly too expensive for commercial application or too cumbersome for retrofitting existing towing vehicles. For example, U.S. Pat. No. 4,558,883, issued to Bouma, discloses such a complicated hitch mechanism.

Some prior art hitch assemblies, such as the one disclosed in U.S. Pat. No. 5,277,447, issued to Blaser, disclose housing and tongue designs which allow limited lateral movement of the tongue. This may be disadvantageous if the towing vehicle is sufficiently misaligned relative to the trailer vehicle to be outside the lateral movement range of the tongue. Repeated positioning of the towing vehicle relative to the trailer vehicle would be required to overcome such a limitation.

SUMMARY OF INVENTION

It is an object of the present invention to provide a hitch for coupling two vehicles, particularly in situations where the vehicles are misaligned.

In accordance with an aspect of this invention, a hitch for coupling a first vehicle to a second vehicle is disclosed. The hitch comprises: (a) a tongue housing for attaching to the first vehicle, the tongue housing comprising a top wall, a bottom wall spaced apart from the top wall by two spaced apart side walls disposed therebetween, the top, bottom and side walls defining a throat, the throat having an open first end and an open second end; (b) a first guide member attached to the housing, comprising: (i) a first cam member; (ii) a first pocket and a second pocket, the first and second pockets being located on either side of the first cam member; (c) a tongue having a first end and a second end, the tongue being extendable and retractable within the throat, the tongue having a width narrower than the distance between the two spaced apart side walls of the tongue housing; (d) retaining means for preventing the tongue from being removed from the throat; (e) a second guide member, coplanar with the first guide member and attached to the second end of the tongue, the second guide member comprising: (i) a second cam member and a third cam member; (ii) a third pocket located between the second and third cam members; (f) a coupler attached to the second end of the tongue; wherein the first and second guide members become matingly engaged upon retraction of the tongue within the throat and wherein the first and second guide members cooperate to align the tongue with the first and second vehicles by the mating engagement of the first cam member with the third pocket and the second and third cam members with the first and second pockets; (g) lock means for locking the tongue in a fixed position relative to the tongue housing upon full engagement of the first and second guide members; and wherein the tongue is capable of lateral articulation when the tongue is not locked in the fixed position.

The cam members and the pockets may be rounded. The second guide member may pivot about either of the first pocket or the second pocket upon the retraction of the tongue from a laterally misaligned position. The bottom wall of the tongue housing may be the first guide member. The side walls of the tongue housing may be centrally rounded to define a generally hourglass shaped throat between the top and bottom walls.

The top wall of the tongue housing may define a top wall aperture therethrough and the tongue may define a tongue aperture therethrough in a location intermediate to the first and second ends of the tongue, the top wall and tongue apertures being aligned upon full engagement of the first and second guide members. The lock means may be a lock pin insertable through the top wall and tongue apertures. The bottom wall may also define a bottom wall aperture therethrough for insertion of the lock pin, the bottom wall aperture being aligned with the top wall aperture. The hitch may further comprise means for biasing the pin towards insertion into the top wall, tongue and bottom wall apertures. The means for biasing the pin towards insertion into top wall, tongue and bottom wall apertures may be a first spring on the lock pin, the first spring mounted between a top wall of a lock pin housing attached to the top wall of the tongue housing and a spring retaining member mounted on an intermediate portion of the lock pin, the top wall of the lock pin housing further comprising a lock pin housing aperture for insertion of the lock pin, the lock pin housing aperture being aligned with the top wall and bottom wall apertures and wherein the tongue aperture becomes aligned with the top wall, bottom wall and lock pin housing apertures upon full engagement of the first and second guide members. The lock pin housing may comprise opposed, bevelled side walls.

The coupler may be selected from the group consisting of a clevis, a ring and a ball.

The coupler may be a clevis comprising: (a) an upper arm, the upper arm defining a first upper arm aperture therethrough; (b) a lower arm, the upper and lower arms being spaced apart by a vertical arm support wall, wherein the upper and lower arms define an opening facing away from the first vehicle for the insertion therein of a coupling means of the second vehicle; (c) a hitch pin insertable through the first upper arm aperture, the hitch pin being movable between a first, raised position and a second, lowered position, the hitch being capable of receiving the coupling means of the second vehicle when the hitch pin is in the first, raised position; (d) a release member extending above an upper surface of the upper arm and through a second upper arm aperture defined in the upper arm; (e) a hitch pin engaging member housed between a first shelf and a second shelf within the upper arm, the first shelf and the second shelf being on either side of the first upper arm aperture, the hitch pin engaging member defining an hitch pin engageing member aperture therethrough for accommodating the insertion of the hitch pin, a lower end of the release member contacting a first end of the hitch pin engaging member; (f) a second spring mounted within the first shelf, the second spring contacting the hitch pin engaging member, wherein the bias of the second spring maintains the hitch pin engaging member in an angled position to frictionally engage the hitch pin; and wherein application of downward force upon the release member causes the hitch pin engaging member to move to a substantially horizontal position against the bias of the second spring and frictionally disengage the hitch pin to permit upward vertical movement of the hitch pin within the first upper arm and pin engageing member apertures.

The vertical arm support wall may abut the tongue housing upon full engagement of the first and second guide members.

The movement of the hitch pin from the first, raised position to the second, lowered position may be achieved through the application of downward force upon the hitch pin and wherein movement of the hitch pin from the second, lowered position to the first, raised position is achieved by lifting the hitch pin after the pin engaging member is frictionally disengaged from the hitch pin through the application of downward force upon the release member, causing the hitch pin engaging member to move to the substantially horizontal position.

The hitch pin may comprise a sleeve and its lower end and the upper arm may comprise a flange extending into the first upper arm aperture to define a radius smaller than the radius of the sleeve, so that the hitch pin cannot be fully withdrawn from the first upper arm aperture. The lower arm may comprise a flange extending into a lower arm aperture to define a radius smaller than the radius of the sleeve so that the lower end of the hitch pin cannot extend through the lower arm of the clevis.

The hitch may comprise a vertical wall substantially enclosing an end of the tongue housing proximal to the first vehicle and defining a slot therein, the slot having a width of at least the distance between the side walls of the tongue housing and having a height of at least the thickness of the tongue. The retaining means for preventing the tongue from being removed from the throat may comprise a trunnion extending through the tongue at a location proximal to the first end of the tongue, the trunnion having a height greater than the height of the slot in the vertical wall.

The hitch may comprise a first square tubing portion attached to and extending from the tongue housing towards the first vehicle, the first square tubing portion having means for attaching the first square tubing portion to a cooperating second square tubing portion attached to and extending from the vehicle.

In accordance with another aspect of the invention, a hitch for coupling a towing vehicle to a trailer vehicle is disclosed. The hitch comprises: (a) a tongue housing for attaching to the towing vehicle, the tongue housing comprising a top wall, a bottom wall spaced apart from the top wall by two spaced apart and centrally rounded side walls disposed therebetween, the top, bottom and side walls defining a throat, the throat having an open first end and an open second end and being generally hourglass shaped, the top wall defining a top wall aperture therethrough; (b) a tongue having a first end and a second end, the tongue being extendable and retractable within the throat, the tongue having a width narrower, than the distance between the two spaced apart side walls, the tongue defining a tongue aperture therethrough in a position intermediate to the first and second ends of the tongue; (c) the bottom wall comprising a first guide member, the first guide member comprising: (i)

a first rounded cam member; (ii) a first rounded pocket and a second rounded pocket, the first and second pockets being located on either side of the first cam member; and (iii) wherein the firt guide member defines a bottom wall aperture therethrough, the bottom wall aperture being aligned with the top wall aperture; (d) a vertical wall substantially enclosing an end of the tongue housing proximal to the first vehicle and defining a slot therethrough, the slot having a width of at least the distance between the side walls of the tongue housing and having a height of at least the thickness of the tongue; (e) a trunnion extending through the tongue at a location proximal to the first end of the tongue, the trunnion having a height greater than the height of the slot in the vertical wall, wherein the trunnion prevents the first end of the tongue from being removed from the throat; (f) a second guide member, coplanar with the first guide member and attached to the second end of the tongue, the second guide member comprising: (i) a second rounded cam member and a third rounded cam member; (ii) a third rounded pocket located between the second and third cam member; (g) a coupler attached to the second end of the tongue; wherein the second guide member is matingly received by the first guide member upon retraction of the tongue within the throat and wherein the first and second guide members cooperate to align the tongue with the towing and trailer vehicles by the mating engagement of the first cam member with the third pocket and the second and third cam members with the first and second pockets; (h) a lock pin housing attached to the top wall of the tongue housing, the lock pin housing comprising a top wall and two opposed bevelled side walls, the top wall of the lock pin housing defining a lock pin housing aperture therethrough, the lock pin housing aperture being aligned with the top wall and bottom wall apertures; (i) a lock pin insertable through the top wall, tongue, bottom wall and lock pin housing apertures; (j) a spring mounted on the lock pin between the top wall of the lock pin housing and a spring retaining member mounted on an intermediate portion of the lock pin, the spring biasing the lock pin towards insertion into the top wall, tongue and bottom wall apertures; wherein when the top wall, tongue, bottom wall and lock pin housing apertures becomes aligned upon full reception of second guide member by the first guide member the lock pin is inserted into the top wall, second, bottom wall and lock pin housing apertures to lock the tongue in a fixed position relative to the housing; and wherein the tongue is capable of lateral articulation when the tongue is not locked in the fixed position.

In accordance with another aspect of the invention, a hitch for coupling a towing vehicle to a trailer vehicle is disclosed. The hitch comprises: (a) a tongue housing for attaching to the towing vehicle, the tongue housing comprising a top wall, a bottom wall spaced apart from the top wall by two spaced apart and centrally rounded side walls disposed therebetween, the top, bottom and side walls defining a throat, the throat having an open first end and an open second end and being generally hourglass shaped, the top wall defining a first aperture therethrough; (b) a tongue having a first end and a second end, the tongue being extendable and retractable within the throat, the tongue having a width narrower than the distance between the two spaced apart side walls, the tongue defining a second aperture therethrough in a position intermediate to the first and second ends of the tongue; (c) the bottom wall comprising a first guide member, the first guide member comprising: (i) a first rounded cam member; (ii) a first rounded pocket and a second rounded pocket, the first and second pockets being located on either side of the first cam member; and (iii) wherein the first guide member defines a third aperture therethrough, the third aperture being aligned with the first aperture; (d) a vertical wall substantially enclosing an end of the tongue housing proximal to the first vehicle and defining a slot therethrough, the slot having a width of at least the distance between the side walls of the tongue housing and having a height of at least the thickness of the tongue; (e) a trunnion extending through the tongue at a location proximal to the first end of the tongue, the trunnion having a height greater than the height of the slot in the vertical wall, wherein the trunnion prevents the first end of the tongue from being removed from the throat; (f) a second guide member, coplanar with the first guide member and attached to the second end of the tongue, the second guide member comprising: (i) a second rounded cam member and a third rounded cam member; (ii) a third rounded pocket located between the second and third cam members; (g) a coupler attached to second end of the tongue; wherein the second guide member is matingly received by the first guide member upon retraction of the tongue within the throat and wherein the first and second guide members cooperate to align the tongue with the towing and trailer vehicles by the mating engagement of the first cam member with the third pocket and the second and third cam members with the first and second pockets; (h) a lock pin housing attached to the top wall of the tongue housing, the lock pin housing comprising a top wall and two opposed bevelled side walls, the top wall of the lock pin housing defining a fourth aperture therethrough, the fourth aperture being aligned with the first and third apertures; (i) a lock pin insertable through the first, second, third and fourth apertures; (j) a spring mounted on the lock pin between the top wall of the lock pin housing and a spring retaining member mounted on an intermediate portion of the lock pin, the spring biasing the lock pin towards insertion into the first, second and third apertures; wherein when the first, second, third and fourth apertures become aligned upon full reception of second guide member by the first guide member the lock pin is inserted into the first, second, third and fourth apertures to lock the tongue in a fixed position relative to the tongue housing; and wherein the tongue is capable of lateral articulation when the tongue is not locked in the fixed position.

In accordance with another aspect of the invention, a hitch for coupling a first vehicle to a second vehicle is disclosed. The hitch comprising a clevis for attaching to the first vehicle, the clevis comprising: (a) an upper arm, the upper arm defining a first upper arm aperture therethrough; (b) a lower arm, the upper and lower arms being spaced apart by a vertical arm support wall, wherein the upper and lower arms define an opening facing away from the first vehicle for the insertion therein of a coupling means of the second vehicle; (c) a hitch pin insertable through the first upper arm aperture, the hitch pin being movable between a first, raised position and a second, lowered position, the hitch being capable of receiving the coupling means of the second vehicle when the hitch pin is in the first, raised position; (d) a release member extending above an upper surface of the upper arm and through a second upper arm aperture defined in the upper arm; (e) a hitch pin engaging member housed between a first shelf and a second shelf within the upper arm, the first shelf and the second shelf being on either side of the first upper arm aperture, the hitch pin engaging member defining a hitch pin engaging member aperture therethrough for accommodating the insertion of the hitch pin, a lower end of the release member contacting a first end of the hitch pin engaging member; (f) a spring mounted within the first shelf, the spring contacting the hitch pin engaging member, wherein the bias of the spring maintains the hitch pin engaging member in an angled position to frictionally engage the hitch pin; and wherein application of downward force upon the release member causes the hitch pin engaging member to move to a substantially horizontal position against the bias of the spring and frictionally disengage the hitch pin to permit upward vertical movement of the hitch pin within the first upper arm and hitch pin engaging member apertures.

The lower arm may define a lower arm aperture, the lower arm aperture being aligned with the first upper arm aperture, the hitch pin being insertable into the lower arm aperture.

The movement of the hitch pin from the first, raised position to the second, lowered position may be achieved through the application of downward force upon the hitch pin.

The movement of the hitch pin from the second, lowered position to the first, raised position may be achieved by lifting the hitch pin after the pin engaging member is frictionally disengaged from the hitch pin through the application of downward force upon the release member, causing the hitch pin engaging member to move to the substantially horizontal position.

The hitch pin may further comprise a sleeve at its lower end and wherein the upper arm further comprises a flange extending into the first upper arm aperture to define a radius smaller than the radius of the sleeve, so that the hitch pin cannot be fully withdrawn from the first upper arm aperture.

The lower arm may further comprise a flange extending into the lower arm aperture to define a radius smaller than the radius of the sleeve so that the lower end of the hitch pin cannot extend through the lower arm of the clevis.

BRIEF DESCRIPTION OF DRAWINGS

In the drawings which illustrate specific embodiments of the invention, but which should not be construed as restricting the spirit or scope of the invention in any way:

FIG. 15 is a perspective, exploded view of the hitch of FIG. 13 with a ball coupler.

FIG. 16 is a perspective view of another alternative embodiment of the hitch of the invention;

FIGS. 17 and 18 are perspective views of prior art "E" type hitches;

DESCRIPTION

The hitch of the present invention allows the coupling of a towing vehicle to a trailer vehicle and is particularly suited for situations where there is imprecise alignment of the coupling means of the two vehicles. As used herein, the term "towing vehicle" encompasses any vehicle for pulling, towing or otherwise drawing a subsequent vehicle, referred to as a "trailer vehicle", coupled therewith. For example, a towing vehicle could be a truck, an RV, a car or a tractor vehicle used at airports for pulling freight (i.e. luggage, etc.) carts. The term "trailer vehicle", on the other hand, encompasses any vehicle which is designed to be pulled, towed or otherwise drawn by a towing vehicle. For example, a towing vehicle could be a boat trailer, an airport freight cart or an airport pallet or container cart. As will be explained later, "towing vehicle" also encompasses a first trailer vehicle which is used to tow a second trailer vehicle in a multiple trailer vehicle train.

Figure 1:
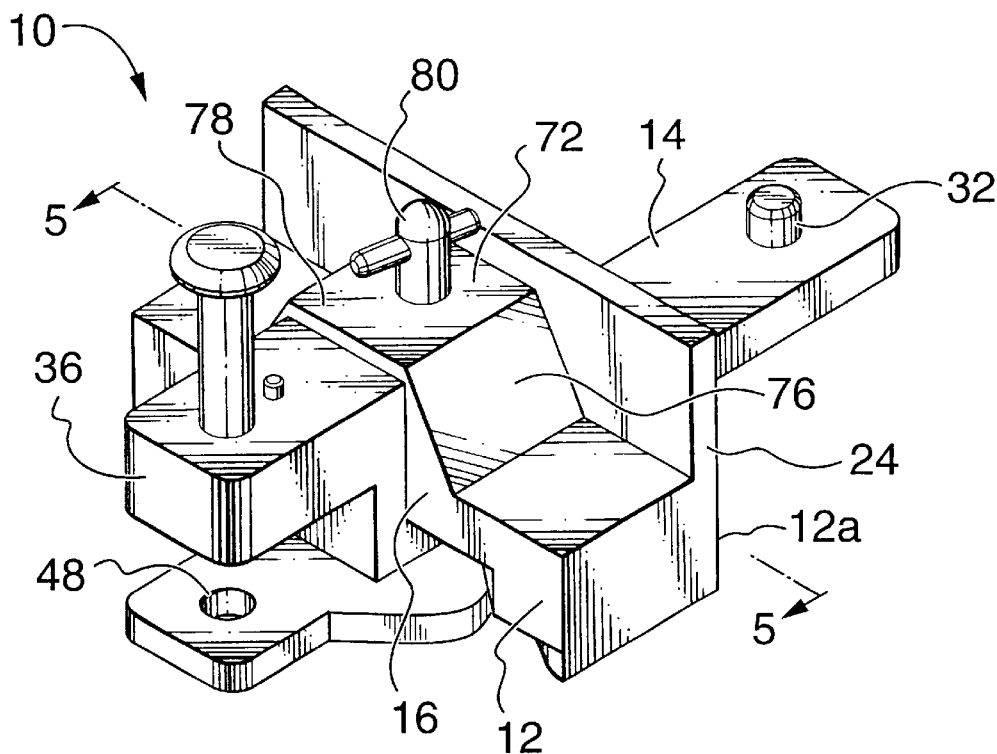
FIG. 1 is a perspective view of an embodiment of the hitch of the present invention illustrating its tongue in a retracted, locked position.

FIG. 1 illustrates a hitch 10, which includes a tongue housing 12 and a tongue 14. Tongue housing 12 is adapted for attachment to a rear end of a towing vehicle, such as, for example, a tractor for pulling freight carts at airports.

Figure 4:
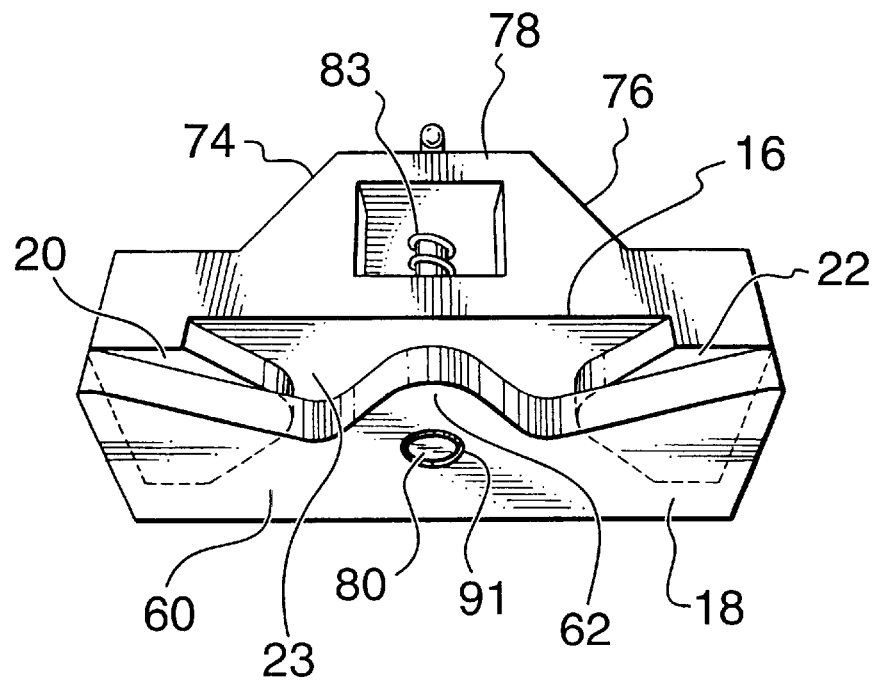
FIG. 4 is a bottom perspective view of the tongue housing of the hitch of FIG. 1 illustrating the side walls of the throat in dotted outline.
Figure 5:
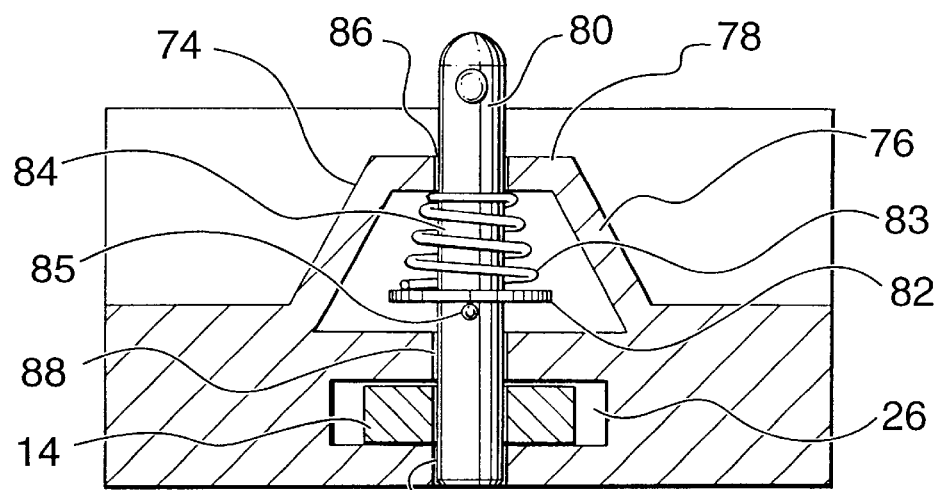
FIG. 5 is a partial cross-section view taken along line 5—5 of FIG. 1 illustrating the insertion of the lock pin through the apertures in the tongue, tongue housing and lock pin housing.
Figure 7:
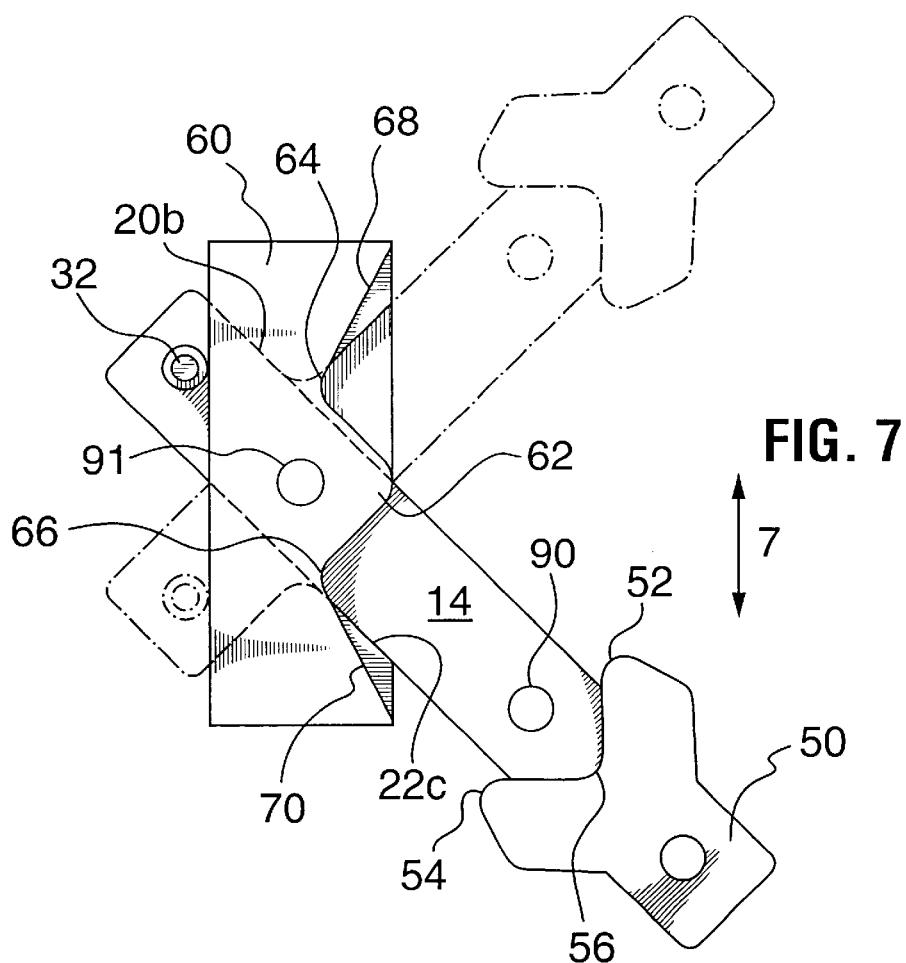
FIGS. 7–10 are bottom views illustrating the guided movement of the tongue from an extended, laterally misaligned position to a retracted, aligned and locked position.
Figure 8:
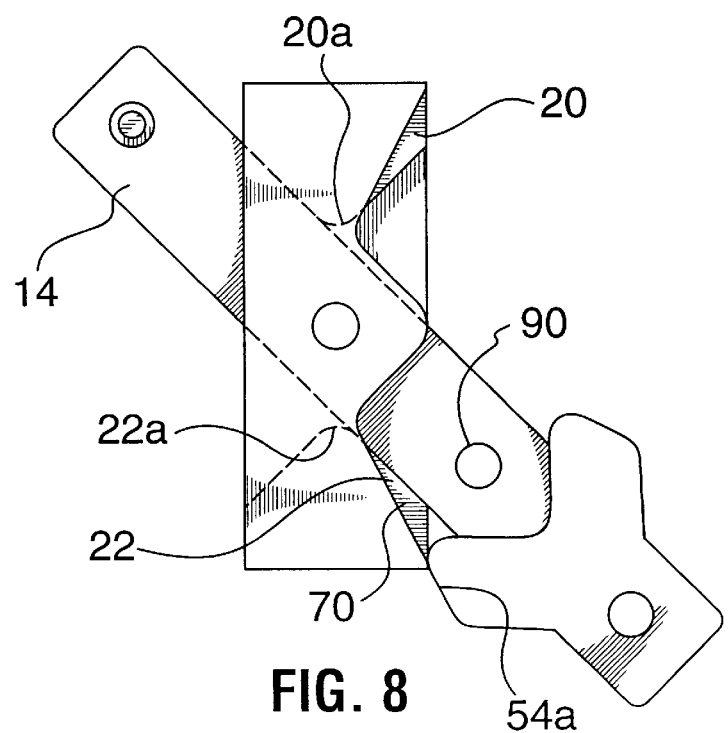
Figure 9:
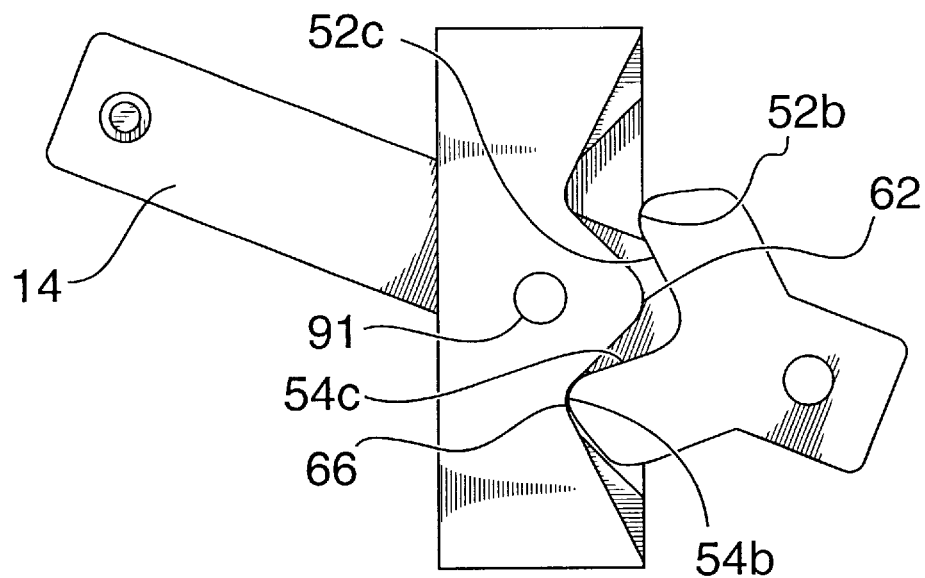

Turning to FIG. 4 in conjunction with FIG. 1, tongue housing 12 includes a top wall 16 and a bottom wall 18, which are in a substantially parallel relationship and which are spaced apart by a distance at least as great as the thickness of tongue 14. Spaced apart side walls 20, 22 are disposed between top wall 16 and bottom wall 18. Together, top wall 16, bottom wall 18 and side walls 20, 22 form a throat 23. Side walls 20 and 22 are spaced apart such a distance that throat 23 has a width greater than the width of tongue 14, thus allowing for lateral articulation of tongue 14. Referring to FIGS. 4, 7 and 8, side walls 20, 22 have rounded central portions 20a and 22a (illustrated in dotted outline in FIG. 8) so that throat 23 is generally hourglass shaped. A vertical wall 24 substantially encloses housing 12 at its forward end 12a. Vertical wall 24 abuts the forward ends of each of top wall 16, bottom wall 18 and side walls 20, 22. Vertical wall 24 has a horizontal slot 26 defined therein, which permits the slidable extension and retraction of tongue 14 within tongue housing 12. FIG. 5 illustrates the width of slot 26 between central rounded portions 20a and 29b of side walls 20 and 22. It will be appreciated that slot 26 widens at the forward opening of throat 23, as with the illustrated rear opening of throat 23 in FIG. 4.

Figure 14:
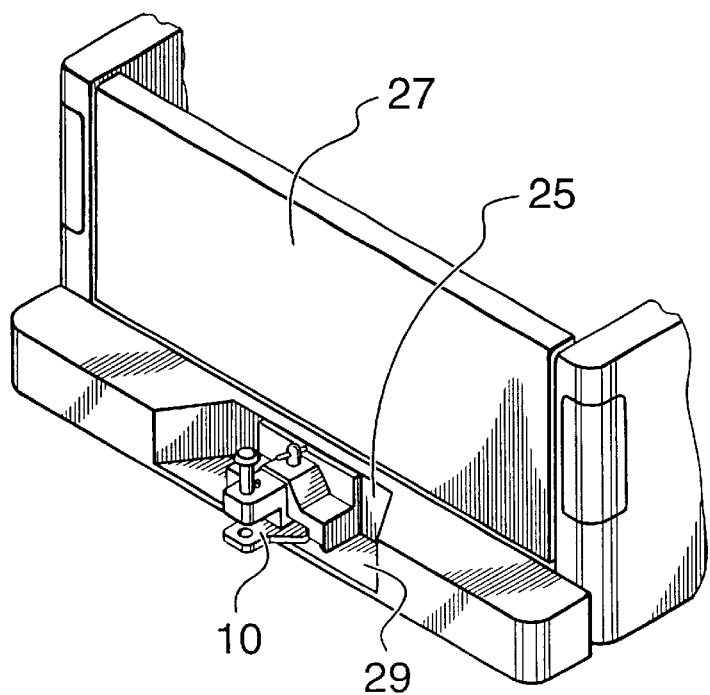
FIG. 14 is a perspective view of the hitch of FIG. 1 mounted to a towing vehicle.

Referring to FIG. 14, vertical wall 24 may conveniently be welded or fastened (such as by bolting) to a vertical surface 25 on the rear end of a towing vehicle 27 to attach tongue housing 12, and ultimately hitch 10, to towing vehicle 27. It will be appreciated by those skilled in the art that the attachment of hitch 10 via vertical walls 24 and 25 is optional and tongue housing 12 could alternatively be attached to towing vehicle 27 in any suitable manner, such as for example, by welding or fastening bottom wall 18 to a horizontal skirt 29 of a standard vehicle commercial bumper. Hitch 10 can thus be easily retrofitted to existing towing vehicles.

For proper operation of hitch 10, housing 12 must be attached to towing vehicle 27 so that tongue 14 can be retracted through vertical wall 24 within or underneath towing vehicle 27. This may require, for example, attaching hitch 10 so that slot 26 is slightly below the lower-most edge of the rear end of towing vehicle 27. Alternatively, a slot (not shown) could be cut from a rear end surface 25 of the towing vehicle at a location aligned with slot 26 to accommodate the insertion of tongue 14 therethrough.

Figure 2:
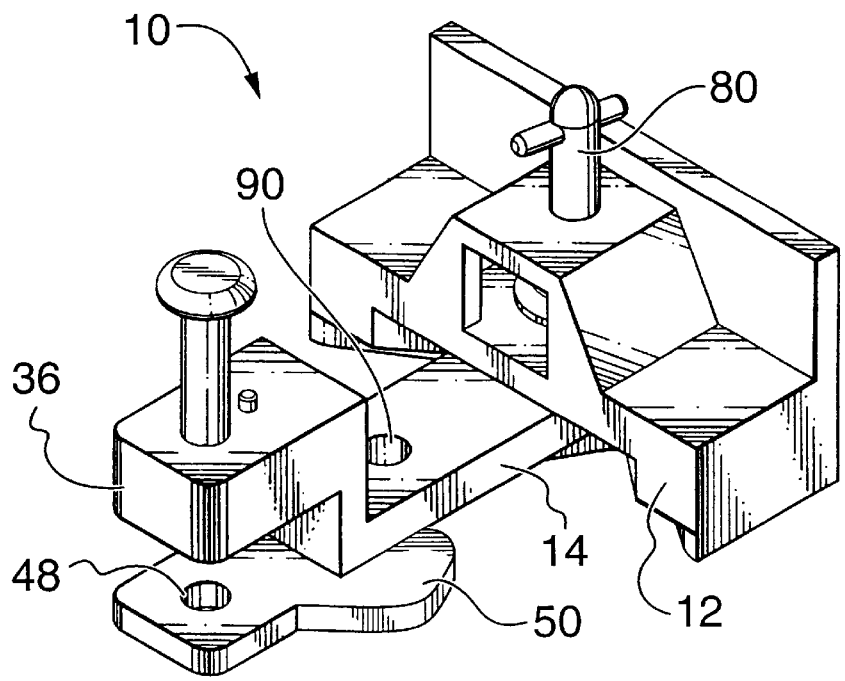
FIG. 2 is a perspective view of the hitch of FIG. 1 illustrating its tongue in an extended, unlocked position.
Figure 3:
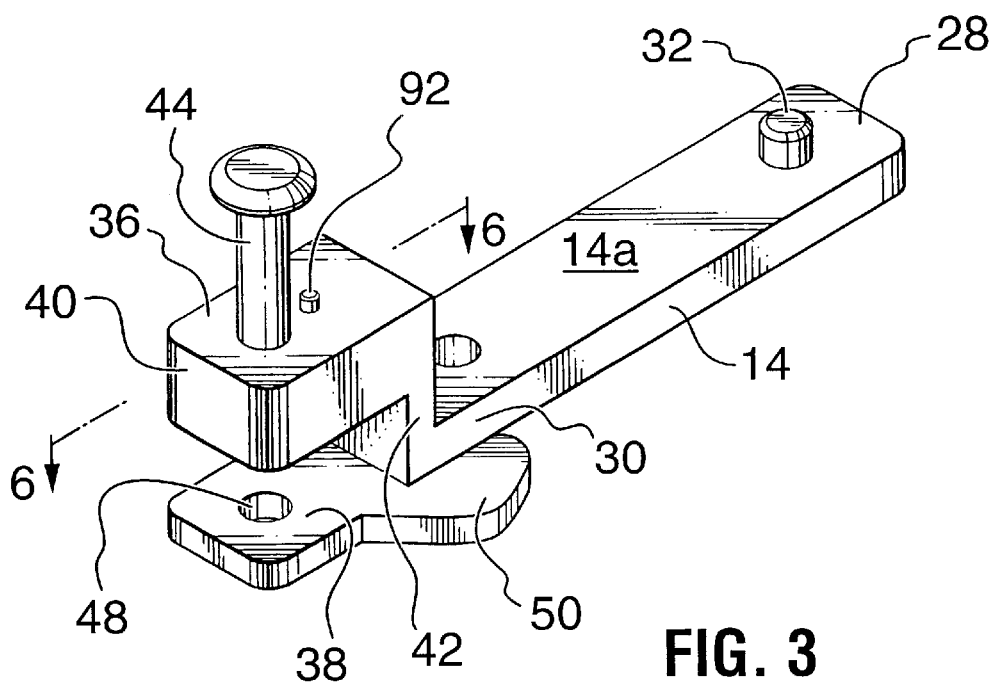
FIG. 3 is a perspective view of the tongue of the hitch of FIG. 1.

Turning to FIG. 3, tongue 14 has a first end 28, and a second end 30. Tongue 14 is extendable, retractable and capable of lateral articulation within throat 23. As used herein, the term "extendable" refers to the movement of extending second end 30 of tongue 14 away from tongue housing 12. For example, tongue 14 is illustrated in an extended position in FIG. 2 relative to the position shown in FIG. 1. The term "retractable", on the other hand, refers to the movement of retracting second end 30 of tongue 14 from an extended position towards tongue housing 12. FIG. 1 illustrates tongue 14 in its fully retracted position.

Tongue 14 includes a trunnion 32, in a location proximal to first end 28. Trunnion 32 extends vertically above and below (see FIG. 7 for an illustration of the extension of trunnion 32 below tongue 14) tongue 14 and has a height greater than the height of slot 26. Trunnion 32 is thus able to retain first end 28 from being fully removed from housing 12 upon extension of tongue 14 (see FIG. 7), and simultaneously permits second end 30 to articulate laterally, relative to first end 28, when tongue 14 is fully extended, so as to allow hitch 10 to couple towing vehicle 27 to an imprecisely aligned trailer vehicle (not shown).

Figure 6:
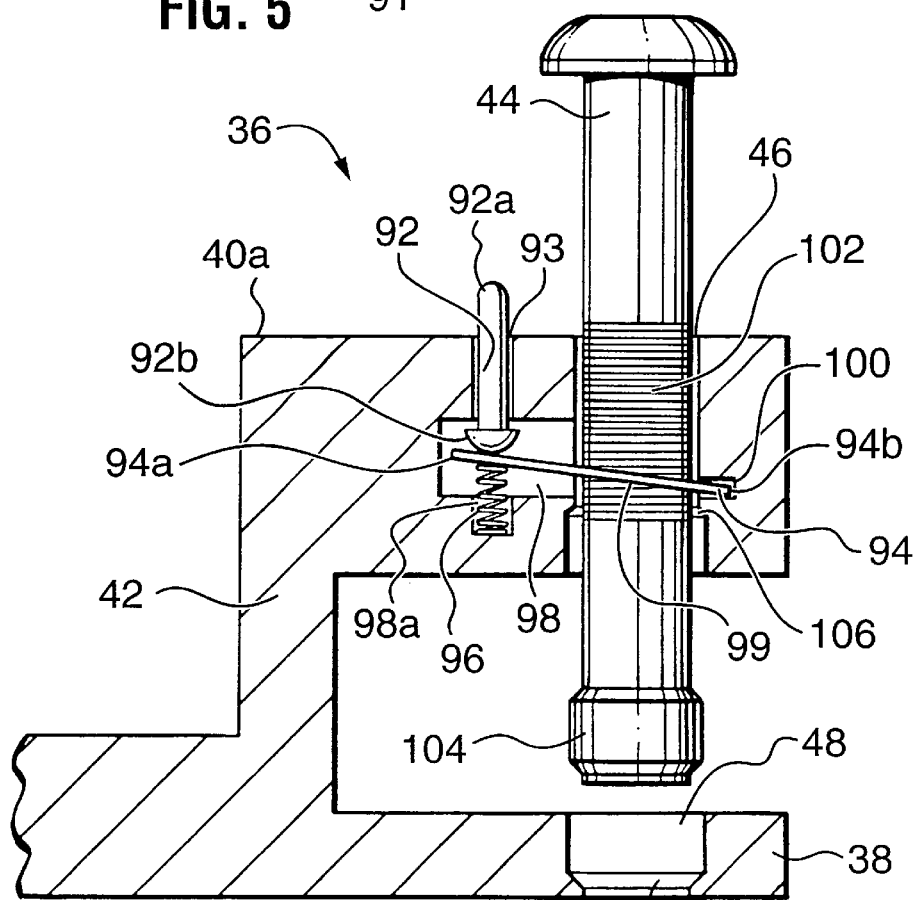
FIG. 6 is a partial cross-section view taken along line 6—6 of FIG. 3 illustrating the hitch pin in a slightly lowered position as compared to FIG. 3.

Tongue 14 has a clevis 36 at its second end 30 for coupling to a cooperating coupler (not shown) operatively secured to the trailer vehicle (not shown). Clevis 36 has a lower arm 38, an upper arm 40, supported by vertical arm support wall 42, and a hitch pin 44. As illustrated in FIG. 6, hitch pin 44 is insertable through an aperture 46 in upper arm 40 and partially insertable into aperture 48 in lower arm 38. Clevis 36 further includes a release member 92, having its upper end 92*a* extending through aperture 93 above an upper surface 40*a* of upper arm 40, and its lower end 92*b* in contact with pin engaging member 94. End 92*b* is shaped to a size larger than aperture 93 so that release member 92 cannot be upwardly withdrawn from upper arm 40 through aperture 93. Pin engaging member 94 has a first end 94*a* and a second end 94*b*. First end 94*a* is in contact with spring 96 and release member 92. Pin engaging member 94 is disposed in shelves 98 and 100 within upper arm 40. Pin engaging member 94 has an aperture 99 intermediate to ends 94*a* and 94*b* to accommodate the insertion of hitch pin 44 therethrough. End 94*b* of pin engaging member 94 rests within shelf 100. A lower end of spring 96 is mounted into sunken portion 98*a* of shelf 98.

In operation, hitch pin 44 is normally in a raised position, illustrated in FIG. 1, so that it is possible to position a corresponding ring (not shown) of a trailer vehicle (not shown) within clevis 36 (between arms 38 and 40) so that coupling can occur with the downward insertion of hitch pin 44 through the ring. Hitch pin 44 is maintained in its raised position by pin engaging member 94. Specifically, when pin engaging member 94 is in an angled position, as illustrated in FIG. 6, there is frictional engagement between an inside edge of pin engaging member 94 (surrounding aperture 99) with the shaft of hitch pin 44 so that hitch pin 44 is maintained in its raised position. Grooves 102 assist in this frictional engagement. When a ring (not shown) is positioned in the clevis between arms 38 and 40, an operator can readily insert hitch pin 44 through the ring (not shown) by applying a downward force on hitch pin 44. This downward force will cause pin engaging member 94 to move to a substantially horizontal position, against the bias of spring 96, so that the shaft of hitch pin 44 frictionally disengages pin engaging member 94, allowing free vertical movement of hitch pin 44. Once hitch pin 44 is inserted downwardly through the ring (not shown) and the downward force ceases, the bias of spring 96 causes pin engaging member to return to its angled position of FIG. 6, again frictionally engaging hitch pin 44 to maintain it in the lowered position. This prevents hitch pin 44 from inadvertently lifting so as to de-couple the trailer vehicle's coupling ring (not shown). Again, grooves 102 assist in the frictional engagement. When de-coupling is desired, the operator applies a downward force to the upper end 92*a* of release member 92 causing end 94*a* of pin engaging member 94 to move downwardly so that pin engaging member 94 moves to a substantially horizontal position so that the internal edge of pin engaging member 94 (surrounding aperture 99) frictionally disengages hitch pin 44, allowing vertical upward movement of hitch pin 44 for de-coupling.

Clevis 36 thus allows for the easy and safe coupling and decoupling of a ring or other coupling means on the trailer vehicle. Coupling is achieved in a straightforward motion by the application of downward force on hitch pin 44. However, clevis 36, and specifically pin engaging member 94, also increase the safety of the entire operation by locking the ring (not shown) in place, thus minimizing the prospects that inadvertent de-coupling will take place at an inopportune time or place.

Hitch pin 44 is fitted with a sleeve 104 at its lower end, which in combination with flange 106 on upper arm 40, prevents the upward removal of hitch pin from clevis 36. Flange 106 extends into aperture 46 to define a smaller radius than sleeve 104. Thus, vertical sliding of pin 44 in aperture 46 is possible, but complete removal of pin 44 is prevented. Flange 108 within aperture 48 of lower arm 38 acts in a similar manner to prevent hitch pin 44 from being lowered to a position below lower arm 38, where it would be vulnerable to inadvertent contact by extraneous objects.

Second end 30 of tongue 14 has attached on its underside a guide member 50. Guide member 50 may be welded (or otherwise fastened) to second end 30 or tongue 14 may be configured so that guide member 50 is integral with it. As illustrated in FIG. 7, guide member 50 is "Y-shaped" and comprises rounded cam members 52, 54 which extend away from one another in a diverging relationship to define a central, rounded pocket 56, which generally faces towards tongue housing 12. An aperture 90 is located on tongue 14 in a location intermediate to first end 28 and second end 30, near to pocket 56.

Turning to FIGS. 4 and 7, bottom wall 18 of housing 12 comprises a "W-shaped" guide member 60, which in operation matingly receives guide member 50 upon retraction of tongue 14 within housing 12. To accommodate this mating reception, guide members 50 and 60 are coplanar with one another. Guide member 60 comprises rounded central cam member 62 and adjacent rounded pockets 64, 66, which generally face a direction away from tongue housing 12. Outside edges 68, 70 flare outwardly from pockets 64, 66, respectively. As will be appreciated by those skilled in the art, bottom wall 18 need not necessarily comprise guide member 60. Rather, these could be separate elements whereby bottom wall 18 is identical in shape to top wall 16 and guide member 60 was attached to the underside of that embodiment of bottom wall 18 (it will be understood that in such an arrangement, guide member 50 would be similarly modified so that it remained coplanar with guide member 60). However, bottom wall 18 and guide member 60 are described herein as one integral element.

Referring to FIGS. 1 and 5, lock pin housing 72 is attached on the upper surface of top wall 16 of housing 12. Lock pin housing 72 comprises bevelled side walls 74, 76 and a top wall 78. The bevelled shape of side walls 74, 76 acts to deflect any inadvertent blows to hitch 10. Housing 72 houses lock pin 80, which is biased downwardly by spring 83. Spring 83 is coiled around a vertical shaft 84 of lock pin 80 and between top wall 78 and spring retaining member 82, maintained on shaft 84 by notch 85, which extends through shaft 84. Lock pin 80 is insertable through apertures 86, 88, 90 and 91, found respectively in top wall 78, top wall 16, tongue 14 and bottom wall 18 (see FIG. 5). When lock pin 80 is inserted through aligned apertures 86, 88, 90 and 91, tongue 14 is "locked" in a fixed axial and lateral position relative to tongue housing 12.

Hitch 10 operates in the following manner. Towing vehicle 27, having hitch 10 attached to its rear end as described above and illustrated in FIG. 14, is positioned near to the forward end of a trailer vehicle (not shown). At this time, tongue 14 is in its "locked" position of FIG. 1 (i.e. guide members 50 and 60 are matingly received and lock pin 80 is inserted through apertures 86, 88, 90 and 91). In order to couple hitch 10 to the trailer vehicle (not shown), lock pin 80 is lifted upwardly against the bias of spring 83 and withdrawn from apertures 91 and 90, of bottom wall 18 and tongue 14, respectively. Lock pin 80 is not, however, removed from apertures 86 and 88. Tongue 14 is then extended from throat 23 and manually positioned so that clevis 36 can be coupled to a cooperating coupling means (not shown) provided on a trailer vehicle or alternatively on a draw bar (not shown) attached to the forward end of a trailer vehicle (not shown). This "unlocking" and coupling action is achieved in a straight-forward and timely manner, allowing hitch 10 to be used repeatedly and efficiently by an operator over a period of time. This simple, yet reliable action may be particularly advantageous for coupling an airport tractor to a freight cart, which is done repeatedly and continuously by airport employees during the course of a day.

Tongue 14 is capable of extension until trunnion 32 engages vertical wall 24 immediately surrounding slot 26. This defines the length of the axial extension of tongue 14. Lateral articulation of tongue 14 is possible to couple imprecisely aligned towing and trailer vehicles. Specifically, tongue 14 is free to articulate laterally, subject only to the lateral constraints of side walls 20, 22 within throat 23, as soon as lock pin 80 is raised from apertures 91 and 90. Very little, if any, axial extension of tongue 14 is required for lateral articulation to be possible, thus permitting coupling of misaligned vehicles which are in very close proximity to one another. When tongue 14 is fully extended, trunnion 32 engages vertical wall 24 of housing 12 as described above and provides a point at which second end 30 of tongue 14 can pivot relative to first end 28. This is illustrated by arrow 7 and the phantom outline of tongue 14 and guide member 50 in FIG. 7.

Whenever tongue 14 is not in its "locked position" of FIG. 1, lock pin 80 will be downwardly biased by spring 82 so that it rides along the top surface 14a of tongue 14.

After tongue 14 is manually positioned (axially and/or laterally), clevis 36 can then be coupled to cooperating coupling means, such as a ring (not shown). As explained above, this is accomplished by inserting downward force on hitch pin 44 causing it to be inserted through the ring (not shown). Hitch pin 44 can be downwardly inserted from its position in FIG. 1, through a ring member (not shown), until its lower end is at least partially within aperture 48. Pin engaging member 94, through the bias of spring 96, returns to its angled position of FIG. 6, frictionally engaging hitch pin 44 and thus preventing any vertical movement of the hitch pin 44 which would allow the inadvertent de-coupling of the ring member (not shown). Grooves 102 assist in this "locking" of hitch pin 44.

Once this coupling takes place, the towing vehicle 27 is advanced in a forward direction. Very shortly thereafter, the brakes of the towing vehicle 27 are applied. As a result of applying the brakes, the forward inertia of the trailer vehicle (not shown) will cause tongue 14 to retract from an extended position and slide further into throat 23. If the towing and trailer vehicles are precisely aligned upon coupling, this retraction takes place in a simple manner until guide members 50 and 60 matingly engage and lock pin 80 falls through apertures 91 and 90 when aperture 90 becomes aligned with apertures 86, 88 and 91.

If, however, the towing and trailer vehicles are imprecisely aligned upon coupling, the smooth guided movement of tongue 14 into its locked position of FIG. 2 is achieved through: (1) the interaction of guide members 50 and 60, and specifically, the mating reception of cam members 52, 54 and 62 and pockets 64, 66 and 56; and (2) the interaction of tongue 14 with side walls 20 and 22. FIGS. 7–10 illustrate this progression.

Turning to FIG. 7, tongue 14 is illustrated in an extended, laterally misaligned position. The shape of throat 23 permits tongue 14 to be laterally articulated to a large degree, as illustrated in FIG. 7, though it is possible to modify hitch 10 so that the articulation range can meet various operational requirements. This wide range of lateral articulation is advantageous because it permits hitch 10 to couple towing and trailer vehicles from misaligned positions that might not be possible with prior art hitches. Additionally, it permits the movement of tongue 14 to its locked position from any number of laterally misaligned positions.

Following coupling to the coupling means on a trailer vehicle (not shown), the forward inertia of the trailer vehicle (achieved as described above) causes tongue 14 to retract further into throat 23, as illustrated in FIG. 8. During this retraction, an outer edge 54a of cam member 54 engages outside edge 70 of guide member 60. Continued retraction of tongue 14 into throat 23 pulls cam member 54 into engagement with pocket 66 of guide member 60 (see FIG. 9). Guide member 50 then pivots about a rounded front portion 54b of cam member 54 and into alignment with guide member 60 as follows. Pocket 56 engages cam member 62 of guide member 60. Cam member 52 then falls into place, first upon the engagement of its inner edge 52c with cam member 62, and second, upon further retraction of tongue 14, by the engagement of a rounded front portion 52b with rounded pocket 64 of guide member 60. When cam members 52, 54 and 62 are fully received by pockets 64, 66 and 56, respectively, aperture 90 becomes fully aligned with apertures 86, 88 and 91, allowing lock pin 80 to be inserted therethrough by the downward bias of spring 83, thus moving hitch 10 to its "locked" position, illustrated in FIG. 10. Hitch 10 is "locked" in that tongue 14 is fixed, laterally and longitudinally, relative to tongue housing 12. As illustrated in FIGS. 7–10, hitch 10 is thus self-aligning in that it operates to facilitate alignment of towing and trailer vehicles.

Figure 10:
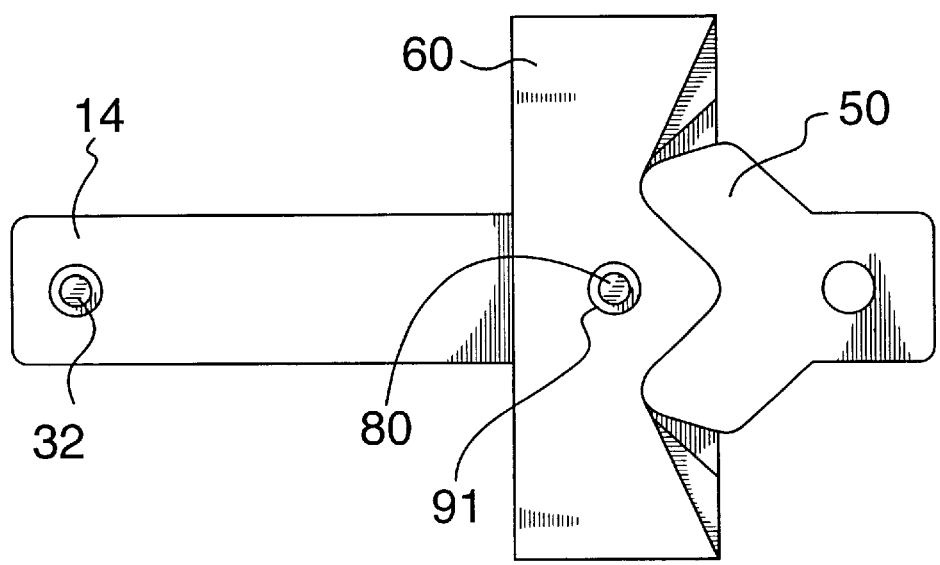

The progression of tongue 14 from its position in FIG. 7 to its position in FIG. 10 is achieved not only by the mating engagement of coplanar guide members 50 and 60, but also through the interaction of tongue 14 with side walls 20 and 22. Referring to FIG. 7, the opposite side edges of tongue 14, upon retraction, are slidably engaged by a rear edge 20b of side wall 20 and a front edge 22c of side wall 22. The sliding engagement of tongue 14 within and into throat 23 helps with the smooth, guided movement of tongue 14 from its most laterally articulated position (FIG. 7) into its locked, aligned and fully retracted position (FIG. 10). It will be appreciated that tongue 14 may be slidably engaged by only one of side walls 20 and 22 from laterally misaligned positions between its lateral articulation range, illustrated in FIG. 7.

Once tongue 14 moves into its locked position of FIG. 10, the operator is thus free to move the towing vehicle-trailer vehicle train to its destination. The mating engagement of guide members 50 and 60, as well as the abutment of vertical arm support wall 42 with tongue housing 12 and lock pin housing 72, causes hitch 10 to have a sturdy construction in its locked position. This sturdy construction minimizes the possibility of damage occurring to hitch 10 upon any inadvertent collisions involving the towing or trailer vehicles when hitch 10 is in use.

It will be appreciated that the engagement of guide members 50 and 60 can occur in the opposite manner as described above. That is, the imprecise alignment of the vehicles may occur in such a manner that it is cam member 52 of guide member 50 which first engages pocket 64 of guide member 60 and then guide member 50 is pivoted until cam member 54 engages pocket 66. This would occur, for example, from the laterally misaligned position as shown in phantom outline in FIG. 7. It will also be appreciated that tongue 14 can move from any number of laterally misaligned positions within the lateral articulation range of tongue 14 illustrated in FIG. 7 to its locked position, depending upon the positions of the towing and trailer vehicles.

It will also be appreciated that the arrangement of hitch 10 helps to overcome the previously-discussed problems that prior art hitch assemblies may suffer from. The rounded edges of cam members 52, 54 and 62 and pockets 64, 66, 56, as well as the interaction of tongue 14 with side walls 20 and 22 in throat 23, allow for the smooth, guided transition of tongue 14 from an extended, misaligned position to its locked position. Because of this arrangement of hitch 10, it is not necessary to first align the vehicles before applying the brakes, as it is with some prior art hitches. Rather, the arrangement of hitch 10 allows for the self-alignment of tongue 14 with housing 12 upon the forward inertia of tongue 14 from any number of laterally misaligned positions. This is advantageous in situations where the operator is faced with limited room to operate, thus limiting the ability to move the towing vehicle-trailer vehicle train into aligned arrangement before locking the hitch.

Figure 11:
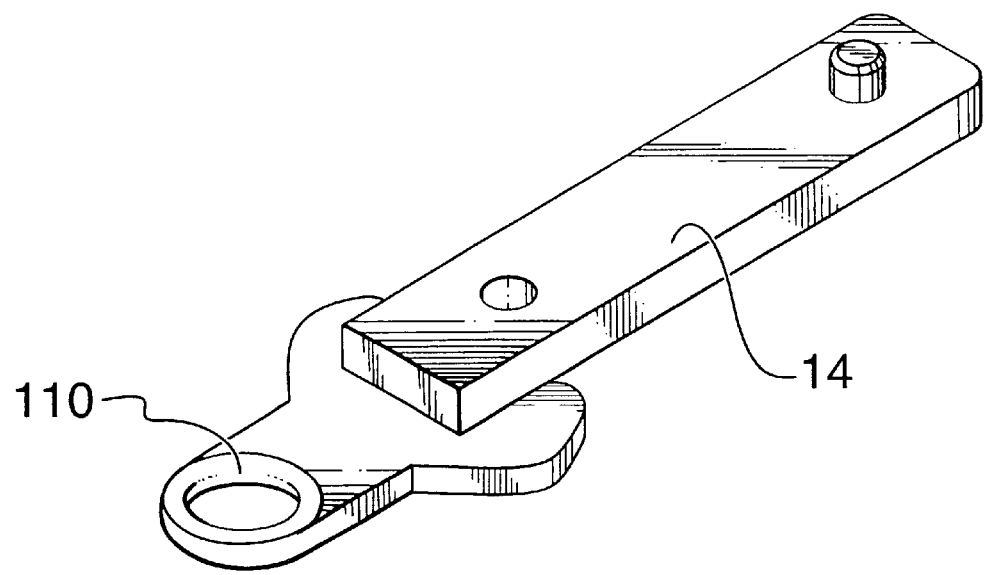
FIG. 11 is a perspective view of a first alternative embodiment of the coupler illustrated in FIG. 3.
Figure 12:
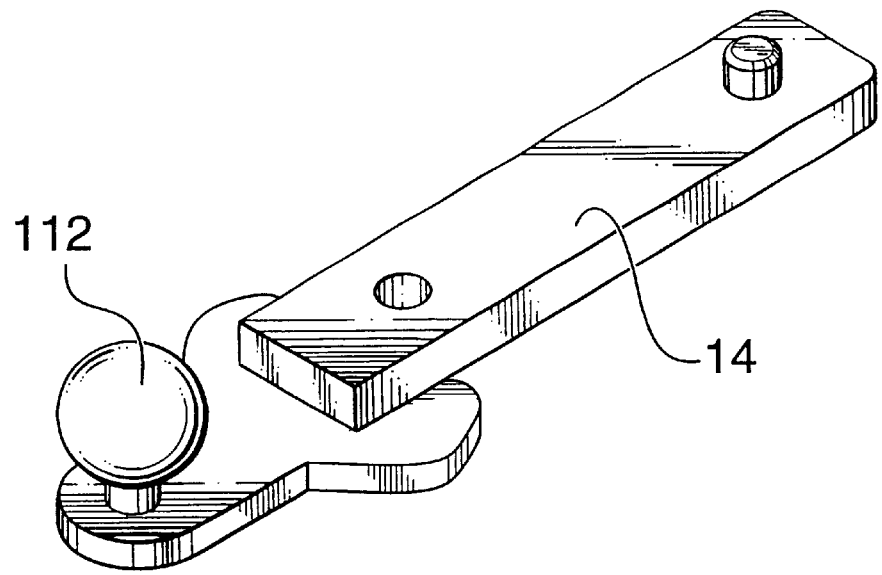
FIG. 12 is a perspective view of a second alternative embodiment of the coupler illustrated in FIG. 3.
Figure 13:
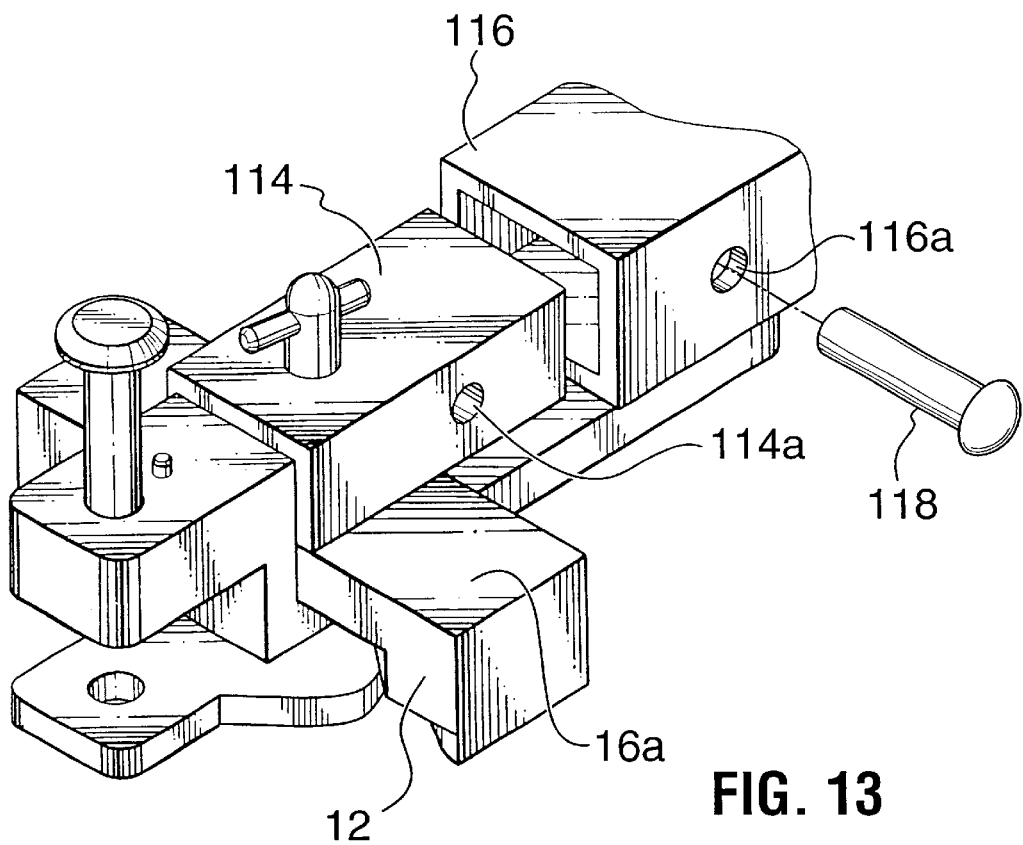
FIG. 13 is a perspective view of an alternative embodiment of the hitch of FIG. 1.

As will be apparent to those skilled in the art in the light of the foregoing disclosure, many alterations and modifications are possible in the practice of this invention without departing from the spirit or scope thereof For example, clevis 36 could be replaced with a ring 110 or a ball 112, illustrated respectively in FIGS. 11 and 12, or any other suitable means for coupling hitch 10 to a trailer vehicle (not shown). Similarly, hitch 10 could be modified as illustrated in FIG. 13 so that the attachment of housing 12 to the towing vehicle 27 could be accomplished by the engagement of square tubing portion 114 with corresponding square tubing portion 116, mounted on the underside of a towing vehicle (not shown). Pin 118 is insertable through apertures 114a and 116a on portions 114 and 116 to maintain portion 114 within portion 116, thus attaching hitch 10 to the towing vehicle 27. In the embodiment of the hitch illustrated in FIG. 13, square tubing portion 114 would thus replace lock pin housing 72 from the previously discussed embodiment and would be attached to tongue housing 12 by means of welding or the like to a top surface 16a of top wall 16. FIG. 15 illustrates this embodiment of the hitch in association with a towing vehicle 27. In FIG. 15, clevis 36 has been replaced with ball 112.

Similarly, it is within the inventive scope herein to utilize hitch 10 not only on the rear of towing vehicle 27, but also on the rear of a trailer vehicle (not shown) where more than one trailer vehicle (not shown) will be pulled by the same towing vehicle. In theory, each trailer vehicle in a multiple trailer vehicle train could be fitted on its rear end with hitch 10 for coupling to a following trailing trailer.

Similarly, it is within the inventive scope of the invention to attach hitch 10 to the front of a trailer vehicle, rather than to a rear surface of towing vehicle 27. In such an embodiment, tongue 14 would thus extend (after pin. 80 is unlocked) away from the trailer vehicle (not shown) and towards towing vehicle 27 for coupling to a coupler attached to the rear of towing vehicle 27. In such an embodiment, it would be guide member 60 which would matingly engage guide member 50 upon the forward inertia of the trailer vehicle (not shown), rather than the opposite as described above.

Similarly, it would also be possible to modify hitch 10 for use as an intermediate between vehicles having already-installed coupling means. That is, housing 12 could be fitted with a coupling means (not shown) for coupling to coupling means (not shown) attached to a rear end of a towing vehicle. Clevis 36 could then be used to couple to corresponding coupling means (not shown) at the front of a trailer vehicle (not shown) and the operation of hitch 10 would remain the same as described above, except that hitch 10 would be releasably coupled to both the towing vehicle and the trailer vehicle.

Similarly, it is within the inventive scope of the invention to modify the length of tongue 14, if the need arises.

The elements of hitch 10 are preferably constructed of a durable steel material, though it will be appreciated that this is not required for operation of hitch 10. Tongue housing 12 and clevis 36 have both been illustrated herein as being of a cast construction. Alternatively, these elements could be constructed of multiple layered, horizontal plates which are fastened (by bolting, welding or any other suitable means) together.

Those skilled in the art will appreciate that the clevis of the invention could be attached directly to a vehicle, apart from hitch 10 as described, for use in coupling other vehicles. This embodiment of the invention is illustrated in FIG. 16.

Hitch 120 is comprised of clevis 136, which is identical in structure and operation to clevis 36 described above and illustrated in FIGS. 1–3, 6, 13 and 14, except that clevis upper arm 140 is illustrated as being constructed from horizontal plates 140a, 140b and 140c. Plate 140a is integral with vertical arm support wall 142. Plates 140a, 140b and 140c are fastened together by any suitable means (such as welding or bolts). Upper arm 140 could also be of a cast construction, as illustrated for upper arm 40 of clevis 36 in FIG. 6.

Figure 19:
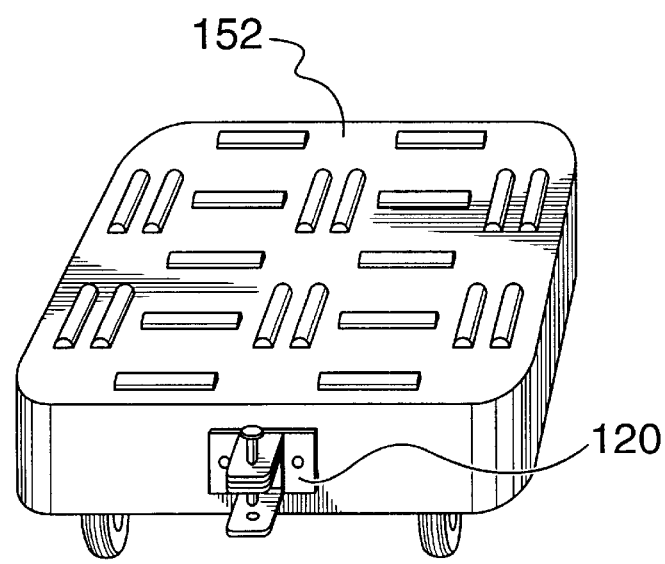
FIG. 19 is a perspective view of the hitch of FIG. 16 mounted to an airport pallet or container carrier.
Figure 20:
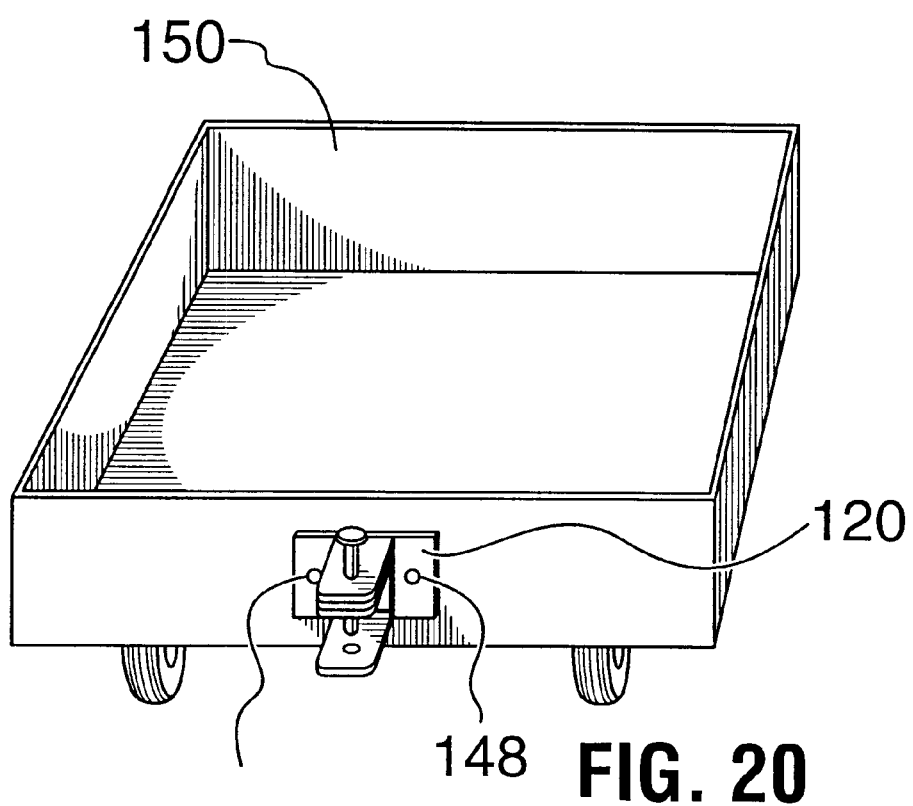
FIG. 20 is a perspective view of the hitch of FIG. 16 mounted to an airport freight vehicle.

Hitch 120 also comprises wall 146, attached to forward portions of upper arm 140, lower arm 138 and vertical arm support wall 142. Wall 146 may be conveniently be bolted (through apertures 148 and 149) to an airport freight vehicle 150, as illustrated in FIG. 20, an airport pallet or container carrier 152, as illustrated in FIG. 19, or to any other towing or trailer vehicle. Wall 146 could alternatively be attached by welding to the towing or trailer vehicle.

Figure 18:
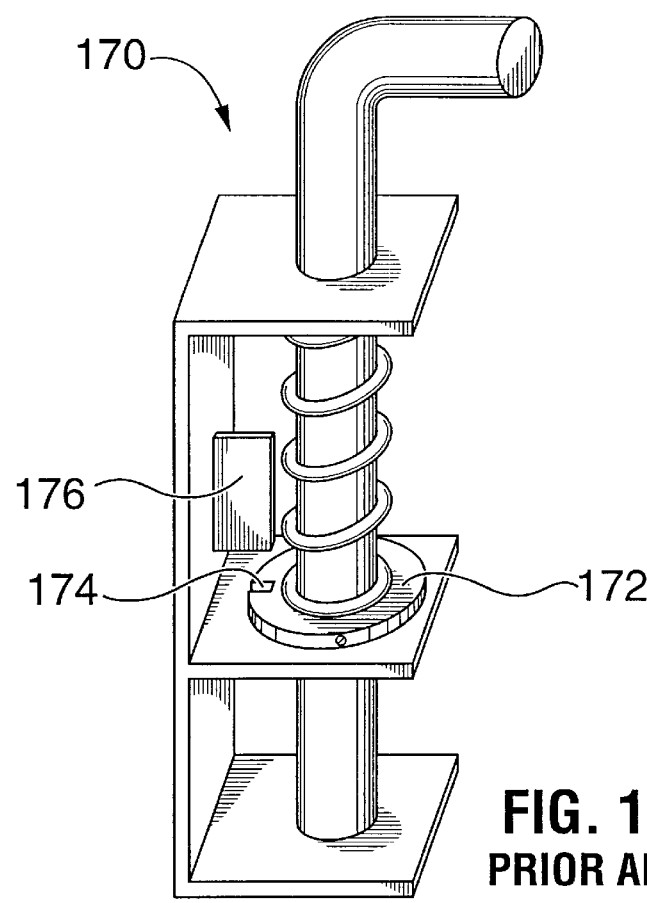

FIGS. 17 and 18 illustrate prior art "E" type hitches, which are in common use on airport carts and carriers. Some "E" type hitches, such as hitch 160 illustrated in FIG. 17, do not include any mechanism to lock the hitch pin in a lowered position, other than the bias of a spring 162 (when notch 164 is rotated to disengage locking member 166, and the hitch pin is lowered). This is disadvantageous since inadvertent de-coupling can occur if the spring malfunctions and the hitch pin rises, allowing the trailer vehicle's coupling means to be released from hitch 160. Other "E" type hitches, such as hitch 170, illustrated in FIG. 18, include a slotted spring plate 172 that prevents upward or downward movement of the hitch pin from its lowered or raised positions, respectively, unless slot 174 is aligned with locking member 176. The "E" hitch illustrated in FIG. 18 is, however, disadvantageous because the unlocking of the hitch can be difficult when the operator is in a hurry. Slot 174 can easily become misaligned relative to locking member 176 so that the operator will be forced to see or manually feel for the alignment of slot 174 and locking member 176, something which may be difficult in dark conditions or inclement weather. Further, "E" type hitches often have a "high" profile so that when used on airport freight vehicles they can interfere with the loading and unloading of the freight vehicles when the hitch pin is inadvertently left in its raised position.

Hitch 120 overcomes these disadvantages by providing a low profile, easy to manufacture hitch which automatically locks its hitch pin in both its lowered and raised positions, thus increasing the safety of the entire operation. Hitch 120 is also easy and quick to operate.

Accordingly, the scope of the invention is to be construed in accordance with the substance defined by the following claims.

What is claimed is:

1. A hitch capable of coupling a first vehicle to a laterally misaligned second vehicle, said hitch comprising:
   (a) a tongue housing for attaching to said first vehicle, said tongue housing comprising two spaced apart side walls defining a throat;
   (b) a first guide member attached to said housing, comprising:
      (i) a first cam member;
      (ii) a first pocket and a second pocket, said first and second pockets being located on either side of said first cam member;
   (c) a tongue having a first end and a second end, said tongue being extendable and retractable within said throat, said tongue having a width narrower than the distance between said two spaced apart side walls of said tongue housing;
   (d) a second guide member, coplanar with said first guide member and attached to said second end of said tongue, said second guide member comprising:
      (i) a second cam member and a third cam member;
      (ii) a third pocket located between said second and third cam members;
   (e) a coupler attached to said second end of said tongue;

wherein said first and second guide members become matingly engaged in an aligned, locked position upon the full retraction of said tongue within said throat from a laterally misaligned position; and wherein said tongue is guided from said laterally misaligned position into said aligned, locked position through the combination of:
   (i) the mating engagement of said first cam member with said third pocket and said second and third cam members with said first and second pockets; and
   (ii) the guided retraction of said tongue along at least one of said side walls of said tongue housing.

2. A hitch for coupling a first vehicle to a second vehicle, said hitch comprising:
   (a) a tongue housing for attaching to said first vehicle, said tongue housing comprising a top wall, a bottom wall spaced apart from said top wall by two spaced apart side walls disposed therebetween, said top, bottom and side walls defining a throat, said throat having an open first end and an open second end;
   (b) a first guide member attached to said housing, comprising:
      (i) a first cam member;
      (ii) a first pocket and a second pocket, said first and second pockets being located on either side of said first cam member;
   (c) a tongue having a first end and a second end, said tongue being extendable and retractable within said throat, said tongue having a width narrower than the distance between said two spaced apart side walls of said tongue housing;
   (d) retaining means for preventing said tongue from being removed from said throat;
   (e) a second guide member, coplanar with said first guide member and attached to said second end of said tongue, said second guide member comprising:
      (i) a second cam member and a third cam member;
      (ii) a third pocket located between said second and third cam members;
   (f) a coupler attached to said second end of said tongue; wherein said first and second guide members become matingly engaged upon retraction of said tongue within said throat and wherein said first and second guide members cooperate to align said tongue with said first and second vehicles by the mating engagement of said first cam member with said third pocket and said second and third cam members with said first and second pockets; and
   (g) lock means for locking said tongue in a fixed position relative to said tongue housing upon full engagement of said first and second guide members; and
wherein said tongue is capable of lateral articulation when said tongue is not locked in said fixed position.

3. The hitch of claim 2 wherein said bottom wall is said first guide member.

4. The hitch of claim 2 herein said side walls are centrally rounded to define a generally hourglass shaped throat between said top and bottom walls.

5. The hitch of claim 1 wherein said top wall of said tongue housing defines a top wall aperture therethrough and wherein said tongue defines a tongue aperture therethrough in a location intermediate to said first and second ends of said tongue, said top wall and tongue apertures being aligned upon full engagement of said first and second guide members, and wherein said lock means is a lock pin insertable through said top wall and tongue apertures.

6. The hitch of claim 5 wherein said bottom wall defines a bottom wall aperture therethrough for insertion of said lock pin, said bottom wall aperture being aligned with said top wall aperture.

7. The hitch of claim 6 further comprising means for biasing said pin towards insertion into said top wall, tongue and bottom wall apertures.

8. The hitch of claim 7 wherein said means for biasing said pin towards insertion into top wall, tongue and bottom wall apertures is a first spring on said lock pin, said first spring mounted between a top wall of a lock pin housing attached to said top wall of said tongue housing and a spring retaining member mounted on an intermediate portion of said lock pin, said top wall of said lock pin housing, further comprising a lock pin housing aperture for insertion of said lock pin, said lock pin housing aperture being aligned with said top wall and bottom wall apertures and wherein said tongue aperture becomes aligned with said top wall, bottom wall and lock pin housing apertures upon full engagement of said first and second guide members.

9. The hitch of claim 8 wherein said lock pin housing further comprises opposed, bevelled side walls.

10. The hitch of claim 2 wherein said coupler is selected from the group consisting of a clevis, a ring and a ball.

11. The hitch of claim 1 wherein said coupler is a clevis comprising:
    (a) an upper arm, said upper arm defining a first upper arm aperture therethrough;
    (b) a lower arm, said upper and lower arms being spaced apart by a vertical arm support wal, wherein said upper and lower arms define an opening facing away from said firstvehicle for the insertion therein of a coupling means of said second vehicle;
    (c) a hitch pin insertable through said first upper arm aperture, said hitch pin being movable between a first, raised position and a second, lowered position, said hitch being capable of receiving said coupling means of said second vehicle when said hitch pin is in said first, raised position;
    (d) a release member extending above an upper surface of said upper arm and through a second upper arm aperture defined in said upper arm;
    (e) a hitch pin engaging member housed between a first shelf and a second shelf within said upper arm, said first shelf and said second shelf being on either side of said first upper arm aperture, said hitch pin engaging member defining a hitch pin engaging member aperture therethrough for accommodating the insertion of said hitch pin, a lower end of said release member contacting a first end of said hitch pin engaging member;
    (f) a second spring mounted within said first shelf, said second spring contacting said first end of said hitch pin engaging member, wherein the bias of said second spring maintains said hitch pin engaging member in an angled position to frictionally engage said hitch pin; and
    wherein application of downward force upon said release member causes said hitch pin engaging member to move to a substantially horizontal position against the bias of said second spring and frictionally disengage said hitch pin to permit upward vertical movement of said hitch pin within said first upper arm and hitch pin engageing member apertures.

12. The hitch of claim 11 wherein said vertical arm support wall abuts said tongue housing upon full engagement of said first and second guide members.

13. The hitch of claim 11 wherein movement of said hitch pin from said first, raised position to said second, lowered position is achieved through the application of downward force upon said hitch pin and wherein movement of said hitch pin from said second, lowered position to said first, raised position is achieved by lifting said hitch pin after said pin engaging member is frictionally disengaged from said hitch pin through the application of downward force upon said release member, causing said hitch pin engaging member to move to said substantially horizontal position.

14. The hitch of claim 11 wherein said hitch pin further comprises a sleeve at its lower end and wherein said upper arm further comprises a flange extending into said first upper arm apperture to define a radius smaller than the radius of said sleeve, so that said hitch pin cannot be full withdrawn from said first upper arm aperture, and wherein said lower arm further comprises a flange extending into a lower arm aperture to define a radius smaller than the radius of said sleeve so that said lower end of said hitch pin cannot extend through said lower arm of said clevis.

15. The hitch of claim 2 further comprising a vertical wall substantially enclosing an end of said tongue housing proximal to said first vehicle and defining a slot therein, said slot having a width of at least the distance between said spaced apart side walls of said tongue housing and having a height of at least the thickness of said tongue.

16. The hitch of claim 15 wherein said retaining means for preventing said tongue from being removed from said throat comprises a trunnion extending through said tongue at a location proximal to said first end of said tongue, said trunnion having a height greater than the height of said slot in said vertical wall.

17. The hitch of claim 2 further comprising a first square tubing portion attached to and extending from said tongue housing towards said first vehicle, said first square tubing portion having means for attaching said first square tubing portion to a cooperating second square tubing portion attached to and extending from said first vehicle.

18. The hitch of claim 2 wherein said cam members and said pockets are rounded.

19. The hitch of claim 18 wherein said second guide member pivots about either of said first pocket or said second pocket upon the retraction of said tongue from a laterally misaligned position.

20. A hitch for coupling a towing vehicle to a trailer vehicle, said hitch comprising:
    (a) a tongue housing for attaching to said towing vehicle, said tongue housing comprising a top wall, a bottom wall spaced apart from said top wall by two spaced apart and centrally rounded side walls disposed therebetween, said top, bottom and side walls defining a throat, said throat having an open first end and an open second end and being generally hourglass shaped, said top wall defining a top wall aperture therethrough;
    (b) a tongue having a first end and a second end, said tongue being extendable and retractable within and through said throat, said tongue having a width narrower than the distance between said two spaced apart side walls of said tongue housing, said tongue defining a tongue aperture therethrough in a position intermediate to said first and second ends of said tongue;
    (c) said bottom wall comprising a first guide member, said first guide member comprising:
        (i) a first rounded cam member;
        (ii) a first rounded pocket and a second rounded pocket, said first and second pockets being located on either side of said first cam member; and
        (iii) wherein said first guide member defines a bottom wall aperture therethrough, said bottom wall aperture being aligned with said top wall aperture;

(d) a vertical wall substantially enclosing an end of said tongue housing proximal to said first vehicle and defining a slot therethrough, said slot having a width of at least the distance between said side walls of said tongue housing and having a height of at least the thickness of said tongue;

(e) a trunnion extending through said tongue at a location proximal to said first end of said tongue, said trunnion a height greater than the height of said slot in said vertical wall, wherein said trunnion prevents said tongue from being removed from said throat;

(f) a second guide member, coplanar with said first guide member and attached to said second end of said tongue, said second guide member comprising:
  (i) a second rounded cam member and a third rounded cam member;
  (ii) a third rounded pocket located between said second and third cam members;

(g) a coupler attached to said second end of said tongue; wherein said second guide member is matingly received by said first guide member upon retraction of said tongue within said throat and wherein said first and second guide members cooperate to align said tongue with said towing and trailer vehicles by the mating engagement of said first cam member with said third pocket and said second and third cam members with said first and second pockets;

(h) a lock pin housing attached to said top wall of said tongue housing, said lock pin housing comprising a top wall and two opposed bevelled side walls, said top wall of said lock pin housing defining a lock pin housing aperture therethrough, said lock pin housing aperture being aligned with said top wall and bottom wall apertures;

(i) a lock pin insertable through said top wall, tongue, bottom wall and lock pin housing apertures;

(j) a spring mounted on said lock pin between said top wall of said lock pin housing and a spring retaining member mounted on an intermediate portion of said lock pin, said spring biasing said lock pin towards insertion into said top wall, tongue, and bottom wall apertures;

wherein said top wall, tongue, bottom wall and lock pin housing apertures become aligned upon full reception of second guide member by said first guide member said lock pin is inserted into said top wall, tongue, bottom wall and lock pin housing apertures to lock said tongue in a fixed position relative to said tongue housing; and wherein said tongue is capable of lateral articulation when said tongue is not locked in said fixed position.

21. A hitch for coupling a first vehicle to a second vehicle, said hitch comprising a clevis for attaching to said first vehicle, said clevis comprising:

(a) an upper arm, said upper arm defining a first upper arm aperture therethrough;

(b) a lower arm, said upper and lower arms being spaced apart by a vertical arm support wall, wherein said upper and lower arms define an opening facing away from said first vehicle for the insertion therein of a coupling means of said second vehicle;

(c) a hitch pin insertable through said first upper arm aperture, said hitch pin being movable between a first, raised position and a second, lowered position, said hitch being capable of receiving said coupling means of said second vehicle when said hitch pin is in said first, raised position;

(d) a release member extending above an upper surface of said upper arm and through a upper arm second aperture defined in said upper arm;

(e) a hitch pin engaging member housed between a first shelf and a second shelf within said upper arm, said first shelf and said second shelf being on either side of said first upper arm aperture, said hitch pin engaging member defining a hitch pin engaging member aperture therethrough for accommodating the insertion of said hitch pin, a lower end of said release member contacting a first end of said hitch pin engaging member;

(f) a spring mounted within said first shelf, said spring contacting said first end of said hitch pin engaging member, wherein the bias of said spring maintains said hitch pin engaging member in an angled position to frictionally engage said hitch pin; and wherein application of downward force upon said release member causes said hitch pin engaging member to move to a substantially horizontal position against the bias of said spring and frictionally disengage said hitch pin to permit upward vertical movement of said hitch pin within said first upper arm and hitch pin engaging member apertures.

22. The hitch of claim 21 wherein said lower arm defines a lower arm aperture, said lower arm aperture being aligned with said first upper arm aperture, said hitch pin being insertable into said lower arm aperture.

23. The hitch of claim 22 wherein movement of said hitch pin from said first, raised position to said second, lowered position is achieved through the application of downward force upon said hitch pin.

24. The hitch of claim 23 wherein movement of said hitch pin from said second, lowered position to said first, raised position is achieved by lifting said hitch pin after said pin engaging member is frictionally disengaged from said hitch pin through the application of downward force upon said release member, causing said hitch pin engaging member to move to said substantially horizontal position.

25. The hitch of claim 22 wherein said hitch pin further comprises a sleeve at its lower end and wherein said upper arm further comprises a flange extending into said first upper arm aperture to define a radius smaller than the radius of said sleeve, so that said hitch pin cannot be fully withdrawn from said first upper arm aperture.

26. The hitch of claim 25 wherein said lower arm further comprises a flange extending into said lower arm aperture to define a radius smaller than the radius of said sleeve so that said lower end of said hitch pin cannot extend through said lower arm of said clevis.

* * * * *